United States Patent
Mao et al.

(10) Patent No.: US 7,035,527 B2
(45) Date of Patent: Apr. 25, 2006

(54) METHOD OF SHARING A MEMORY BETWEEN A BROWSER MODE AND A VIDEO MODE TO REDUCE MEMORY USAGE IN A VIDEO SYSTEM

(75) Inventors: Yu-hai Mao, Santa Clara, CA (US); Chorng-Yeong Chu, San Jose, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 09/096,811

(22) Filed: Jun. 12, 1998

(65) Prior Publication Data
US 2002/0172500 A1 Nov. 21, 2002

(51) Int. Cl.
*H04N 5/91* (2006.01)

(52) U.S. Cl. .................. 386/69; 386/95; 386/125; 715/513; 715/718

(58) Field of Classification Search ............... 386/45, 386/125, 126, 68, 70, 185–186, 52, 55, 69, 386/95; 345/113, 541, 547, 544, 115–116, 345/718; 715/718, 513
See application file for complete search history.

(56) References Cited

U.S. PATENT DOCUMENTS

| | | | | |
|---|---|---|---|---|
| 5,101,364 A | * | 3/1992 | Davenport et al. | 386/95 |
| 5,142,521 A | * | 8/1992 | Terashima et al. | 386/126 |
| 5,630,006 A | * | 5/1997 | Hirayama et al. | 386/92 |
| 5,687,160 A | * | 11/1997 | Aotake et al. | 386/126 |
| 5,701,385 A | * | 12/1997 | Katsuyama et al. | 386/106 |
| 5,751,369 A | * | 5/1998 | Harrison et al. | 348/552 |
| 5,764,304 A | * | 6/1998 | Harrison et al. | 348/552 |
| 5,999,694 A | * | 12/1999 | Yasuda et al. | 386/70 |
| 6,130,988 A | * | 10/2000 | Jeong | 386/125 |
| 6,154,601 A | * | 11/2000 | Yaegashi et al. | 386/52 |
| 6,208,802 B1 | * | 3/2001 | Mori et al. | 386/96 |
| 6,363,204 B1 | * | 3/2002 | Johnson et al. | 386/68 |
| 2002/0172500 A1 | * | 11/2002 | Mao et al. | 386/125 |

* cited by examiner

*Primary Examiner*—Vincent Boccio
(74) *Attorney, Agent, or Firm*—Farjami & Farjami LLP

(57) ABSTRACT

The present invention provides a method and system for switching between browser and video modes in a standalone VCD-ROM system including a VCD player and a VCD-ROM disk. A browser program is first executed in the VCD-ROM system. The browser program allows a user to navigate through the content of the VCD-ROM disk by selecting hypertext links. The hypertext links are selected by clicking on clickable text, buttons, and graphics. The system also allows the user to play a video by selecting an associated hypertext link. When the video is selected, the method of the present invention saves the return address and the address of the video. The video is then played on the video system. When the video is finished playing, the method of the present invention reloads the return address into the system. This returns the system to the original browser mode of the browser.

18 Claims, 6 Drawing Sheets

METHOD OF SHARING A MEMORY BETWEEN A BROWSER MODE AND A VIDEO MODE TO REDUCE MEMORY USAGE IN A VIDEO SYSTEM

FIELD OF THE INVENTION

The present claimed invention relates to the field of video CD-ROM. More particularly, the present claimed invention relates to switching between browser and video modes in a standalone video CD-ROM system.

BACKGROUND ART

In recent past, the compact disk read-only-memory (CD-ROM) technology has profoundly transformed the way video and audio are stored and disseminated. On the audio front, the audio CD-ROM technology has made phonograph an obsolete technology. In the video field, the video CD-ROM technology is rapidly making inroads into the arena previously occupied by traditional video tape technology as video CD-ROMs (e.g., multimedia CD-ROM disks, karaoke CD-ROM disks, DVDs, etc.) are becoming increasingly popular. In particular, the Video CD-ROM technology offers more efficient access and portability over the traditional video tape.

In order to facilitate migration to CD-ROM technologies, the Moving Photographic Expert Group (MPEG) has set up several well known standards for compression of digital audio and video transmission at various bit rates. In particular, MPEG-1 standard was developed for storing and distributing video and audio, with emphasis on video quality. MPEG-1 facilitates coding of video for digital storage media such as CD-ROM at rates of 1 to 1.5 Megabits per second (Mb/s). In addition to forward playback, some features of MPEG-1 include random access, fast forward, and reverse playback. This standard is widely used for storing and distributing video CDs and many video games.

Today, due in large part to these advantages, the CD-ROM technology has been widely incorporated into personal computers. Indeed, the majority of personal computers sold today include a CD-ROM drive of one type or another. This incorporation of the CD-ROM technology in computer systems has largely coincided with the popularity of multimedia applications containing text, graphics, images, audio, video, etc. For instance, the multimedia marketplace is replete with various educational and entertainment CD-ROM disks that allow a user to browse the contents of the disks interactively. These disks typically contain a menu or a browser that enable the user to interactively browse or navigate through the contents of the disks in a nonsequential manner.

Unfortunately, the multimedia CD-ROM disks typically require a computer system equipped with a CD-ROM drive (i.e., player) to browse and playback the contents. Even today, a typical low-end computer costs around $1,000. Hence, a user without a computer must invest a substantial amount of money to be able to use the multimedia CD-ROM disks.

A standalone Video CD player, on the other hand, usually costs less than $200 in today's market and plays the contents of a VCD or CD disk directly on a TV set or a stereo system. For example, the conventional audio CD player plays audio CD-ROM disks to a stereo system and conventional video CD player (e.g., karaoke player, video CD player, DVD player, etc.) plays video CDs directly onto a standard TV.

Although standalone CD-ROM system connected to a TV plays CD-ROM disks containing only video with little trouble, playing back the content of a CD-ROM disk multimedia disk has posed more of a challenge. For example, while browsing the disk in a browser mode (e.g., text, browser, menu, etc.), a user may choose to play a video clip. However, playing a video such as movies and video clips generally requires a large bandwidth and resources. In particular, in a standalone CD-ROM system without the processing resources of a full computer system, playing a video clip typically requires that an MPEG decoder have exclusive access to the resources in the system such as memory (e.g., random access memory). In the inexpensive standalone CD-ROM system with limited resources, the MPEG decoder's monopoly of the resources typically displaces the content of the memory including the addresses and data associated with the original browser mode.

Thus, what is needed is a method and system for returning to the original browser (e.g., browser, menu, etc.) mode after playing a video in a standalone CD-ROM system. The present invention satisfies these needs by providing a method that switches between the browser and video modes in a standalone CD-ROM system.

SUMMARY OF THE INVENTION

The present invention provides a method and system for switching between browser and video modes in a standalone video CD-ROM (VCD-ROM) system. Data segments of browser program and video program are first loaded into a memory unit in the system and the code of browser program is executed on the ROM unit in the standalone system. The browser program allows a user to navigate through the content of the VCD-ROM disk by selecting hypertext links. The hypertext links are selected by clicking on clickable text, buttons, and graphics. The system also allows the user to play a video by selecting an associated hypertext link. When the video is selected, the present invention saves the return address and the address of the video, then removes the data segment of the browser program and executes the program of MPEG decoder. The video is then played on the video system. When the video is finished playing, the method of the present invention reloads the data segment of the browser and executes the browser of the program. This returns the system to the original browser mode of the browser. By switching between the browser and video modes, the present invention saves memory otherwise required for maintaining both browser and video data segments in the video mode, and thus cost.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

In the following detailed description of the present invention, a standalone video CD-ROM switching method and system, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention provides a method and system for switching between browser and video modes in a standalone video CD-ROM (VCD-ROM) system, which can be attached to a TV for playback. The standalone VCD-ROM system is any standalone system that can attach to a TV for playing a VCD-ROM disk containing video and includes CD-ROM system, karaoke system, DVD system, etc. The present invention switches between browser and video modes by saving the return address of the browser mode and the address of the video in a reserved memory space. The rest of the memory is used in decoding the video. When the video is finished playing, the original browser mode is restored by reloading the return address and data segment to the browser mode. By switching between the browser and video modes, the present invention saves memory otherwise required for maintaining both browser and video modes, and thus cost.

Figure 1:
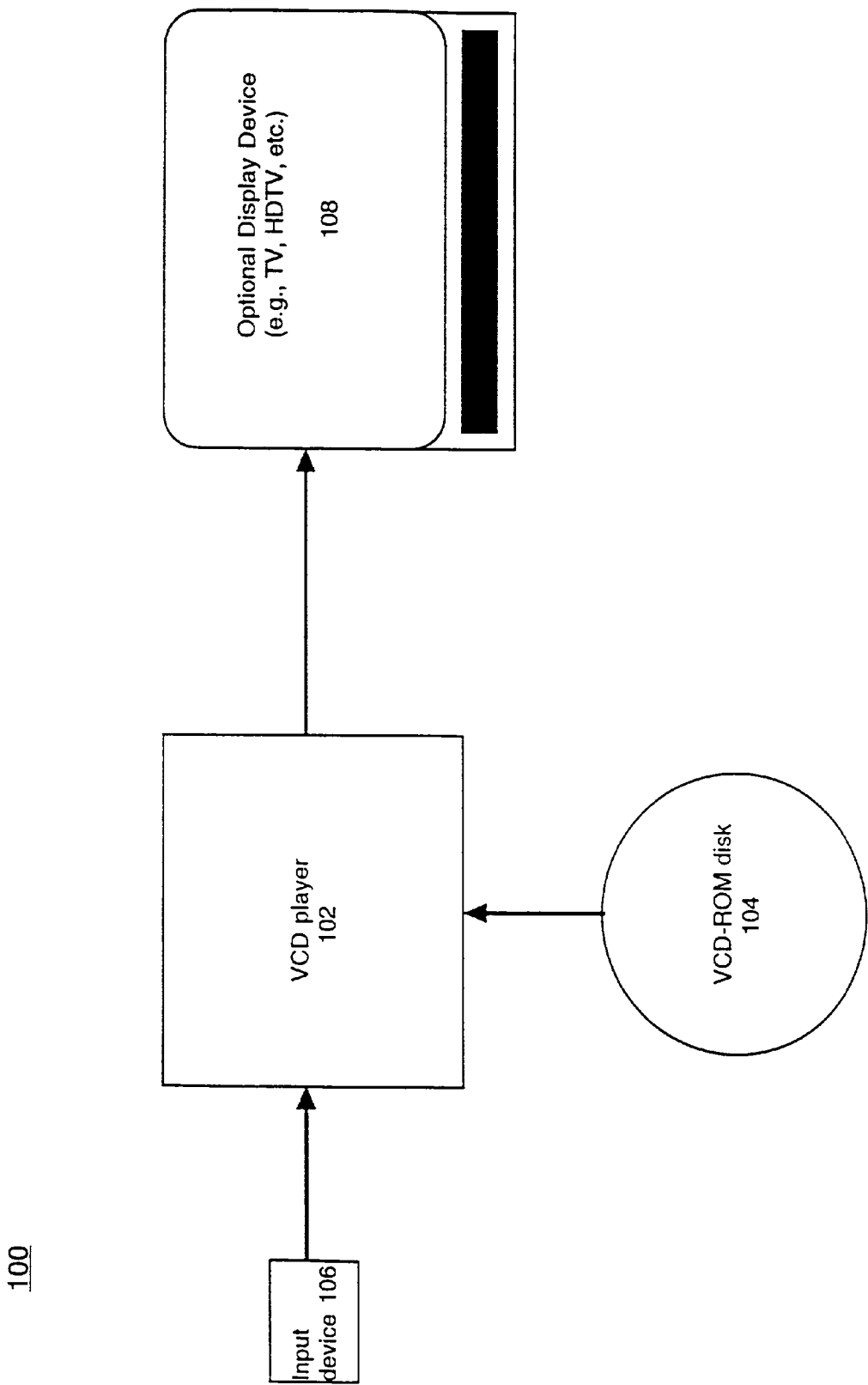
FIG. 1 illustrates a block diagram of a standalone VCD-ROM system.

FIG. 1 illustrates a block diagram of a standalone VCD-ROM system 100. The VCD-ROM system 100 includes a VCD player, a VCD-ROM disk 104, an input device 106, and an optional displace device 108 (e.g., TV, HDTV, etc.). In response to an input signal from the input device 106, the VCD player 102 plays back the contents of a VCD-ROM disk 104 for audio-visual display on the display device 108. Although the present invention employs CD-ROM disks, it can also utilize rewritable or recordable CD-ROM disks.

Figure 2:
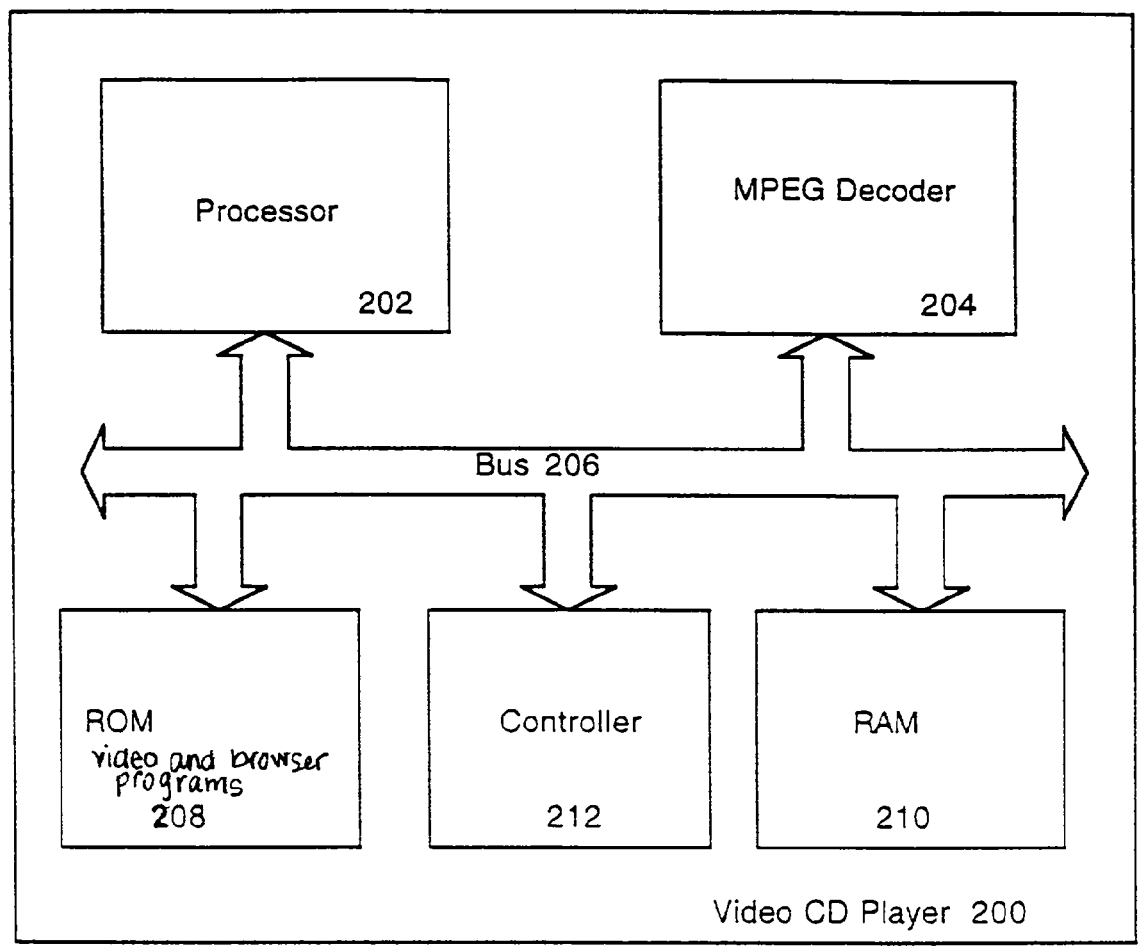
FIG. 2 illustrates a video CD player including a processor, MPEG decoder, a ROM, a RAM, a bus, and a controller.

FIG. 2 illustrates a block diagram of a standalone VCD player 200, which couples to a TV (e.g., standard TV, HDTV, etc.) to play the contents of a VCD-ROM disk. The VCD player 200 can be any CD-ROM player that plays a video CD and includes traditional video CD-ROM player, karaoke player, DVD player, etc. The VCD player 200 comprises a processor 202, an MPEG decoder 204, a bus 206, a read-only-memory (ROM) 208, a random-access-memory (RAM) 210, and a controller 212. ROM 208 is used to store video and/or browser programs. The processor 202 is a general purpose programmable processor and executes programs such as a browser or search engine program. Since video and audio are typically encoded in accordance with MPEG standard, the MPEG decoder 204 decodes video and audio data streams and converts them into analog composite video signal for display on TV. The converted analog signal is then transmitted to a standard TV for viewing.

The controller 212 receives input signal from an input device such as an infrared remote control, a keypad, or a keyboard. In response to the information entered from the input device, the controller 212 decodes the input signal and transmits the decoded signals to the VCD player 200. For example, the decoded input signal may direct the read head of the VCD player 200 to a specified position to read a specific portion of the VCD-ROM disk.

The VCD player 200 of the present invention includes two memory units: a ROM 208 and a RAM 210. The ROM 208 stores a browser program, browser data, a video program and video data. The RAM 210 is used to store data from ROM 208 and VCD-ROM disk. The processor 202 and the MPEG decoder 104 executes the programs in ROM 208 and data from the RAM 210.

The VCD player 200 of the present invention plays a special VCD-ROM disk. In particular, the special VCD-ROM disk contains data. The data includes text, graphics, images (e.g., GIF, JPEG, etc.), audio (e.g., MPEG-1), and video (MPEG-1). The browser program enables a user to interactively browse and play back in the VCD-ROM disk in a systematic manner. Data is stored in the VCD-ROM disk as files and organized under a directory structure as is well known in the art. It should be recognized that VCD-ROM disks include disks containing video (e.g., movies, video clips, etc.) and as such may include traditional CD-ROM disks, karaoke disks, DVD disks, etc.

When a VCD-ROM disk is first inserted into the VCD player 200 at bootup, the VCD player 200 automatically executes the browser program and loads data segments of video program and browser program into memory (e.g., RAM). The browser program allows navigation and search through the contents of the VCD-ROM disk in a manner substantially similar to the today's typical web-browsers. That is, the browser program is accessed in a hierarchy of pages, starting with a home page. Other pages are then accessed through hyperlinks. Those skilled in the art will appreciate that browser programs based on menus and search engines can also be structured in a hierarchical order with hyperlinks.

Figure 3:
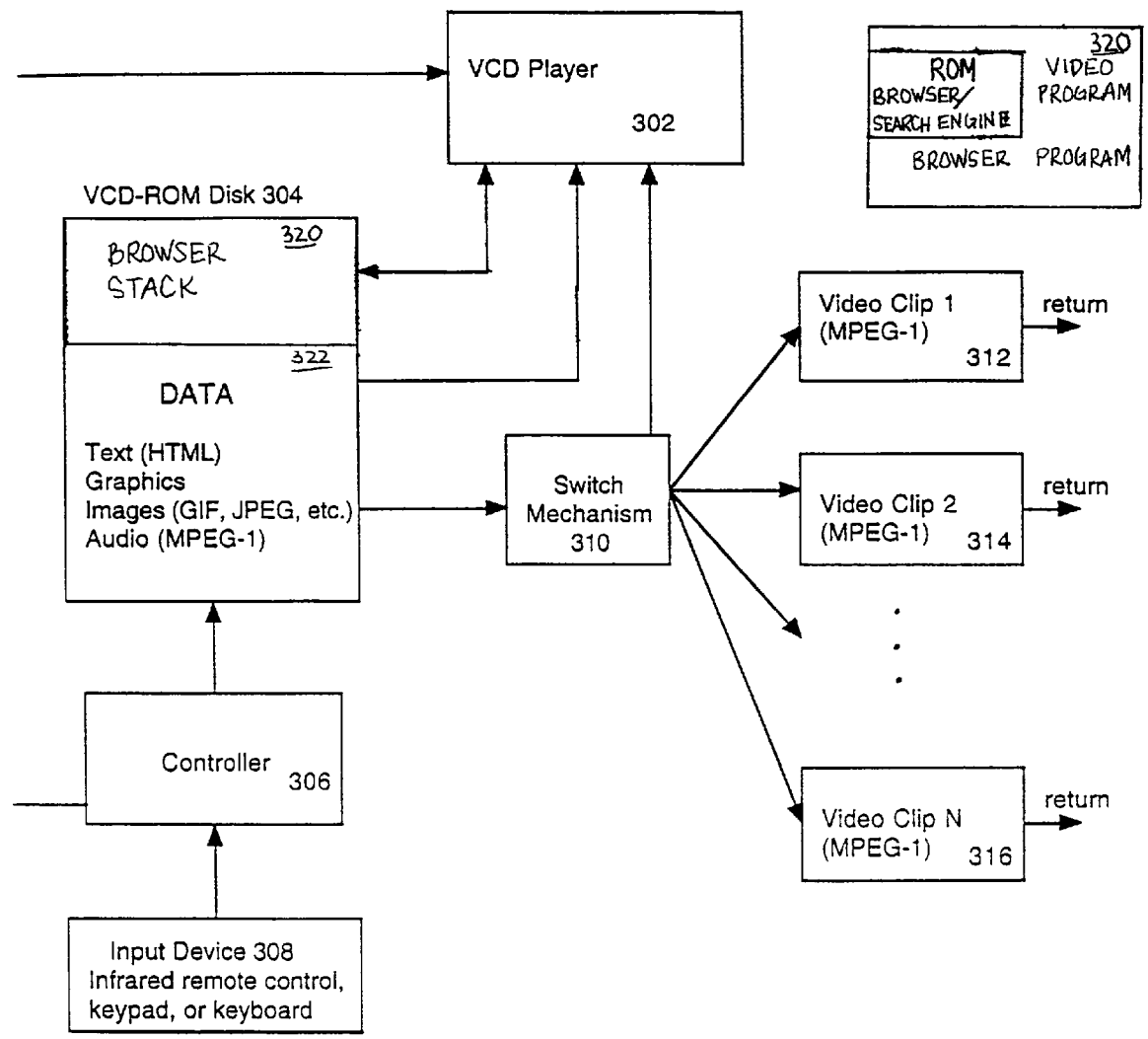
FIG. 3 illustrates a standalone video CD-ROM (VCD-ROM) system in accordance with the present invention.

The present invention provides a method for switching between browser and video modes in a standalone VCD-ROM system. FIG. 3 illustrates a block diagram of the switching mechanism within a standalone VCD-ROM system 300 in accordance with the present invention. The VCD-ROM system 300 includes a VCD player 302 and a VCD-ROM disk 304. The standalone VCD player 302 is a CD player which can playback a VCD-ROM disk on a television (i.e., TV, HDTV, etc.). The VCD-ROM disk 304 is a CD-ROM disk containing text, graphics, images, video, and/or audio clips.

At bootup, the VCD-ROM system 300 displays a default page, which is the home page. From the home page, other pages can be accessed by clicking on clickable buttons, text, or graphics. Video and audio clips stored in the VCD-ROM disk 304 are equally accessible by clicking an a button associated with the clips. The content of the VCD-ROM disk 304 is thus accessible to a user in a manner similar to browsing web pages. In the present invention, browser mode refers to the mode used to navigate through the content of the VCD-ROM disk 304. As such, the browser mode includes display of any data and program format except video playback. Hence, it includes browser, menu, or search engine modes, which display text, graphics, images, sound, buttons, icons, etc. On the other hand, video mode refers exclusively to the playback of any video including movies, video clips, etc. In short, browser mode encompasses all audio-visual mode except for playing back a video.

The VCD player 302 loads the browser program into a memory unit (e.g., RAM) in accordance with the present invention. Initially, the browser program is executed from the ROM 320 at the time of bootup. ROM 320 may include one or more of the following: a video program, browser, search engine and etc. When the VCD player 302 plays back a video from the VCD-ROM disk 304, the data segment of the browser program in the RAM is displaced by the video bitstream. This is because the MPEG decoder requires the RAM for decoding the video bitstream. After the video is played, the browser program is executed from the ROM, data segment of the browser program is reloaded back to RAM and data in VCD-ROM disk 304 will also be loaded upon returning from the video mode to browser mode. That is, the browser program is automatically loaded upon returning from playing a video stream. VCD-ROM disk 304 contains a video data segment 320, browser stack 321, and data segment 322 (e.g., HTML text, graphics, image and audio data).

In the present invention, the switch 310 for switching between the browser (e.g., browser, menu, search engine program, etc.) mode and the video (e.g., movie, video clip, etc.) mode is initiated by saving the return address to the browser mode and the address of the selected video into a reserved space in memory (e.g., RAM). The rest of the memory is used for loading data segments of programs, stack and other data. The video is then loaded into the memory and decoded by the MPEG decoder. The decoded video is then transmitted to a TV (e.g., standard TV, HDTV, etc.) for play. When the selected video is finished playing, data segment of the browser is reloaded and the original browser mode is restored by loading the browser mode indicated by the return address. In this manner, the return address of the original browser mode and the address of the selected video are saved securely in a reserved memory space for exclusive use in the switching process. In one embodiment, the switching mechanism of the present invention is stored in the VCD-ROM disk 304. In an alternative embodiment, the switch 310 is stored in a read-only-memory (ROM) in the VCD player.

Besides data segment of the browser program being loaded into memory at bootup, it is also loaded into the memory after playing a video clip. In this case, the present invention saves the return address, and the starting and ending addresses of the video clip. That is, when a user wishes to play a video clip, the user clicks a clickable button or text with a hyperlink to the video clip. The video system of the present invention then saves the return address of the page to return to, which is a filename and a directory name in the VCD-ROM disk 304.

Figure 4:
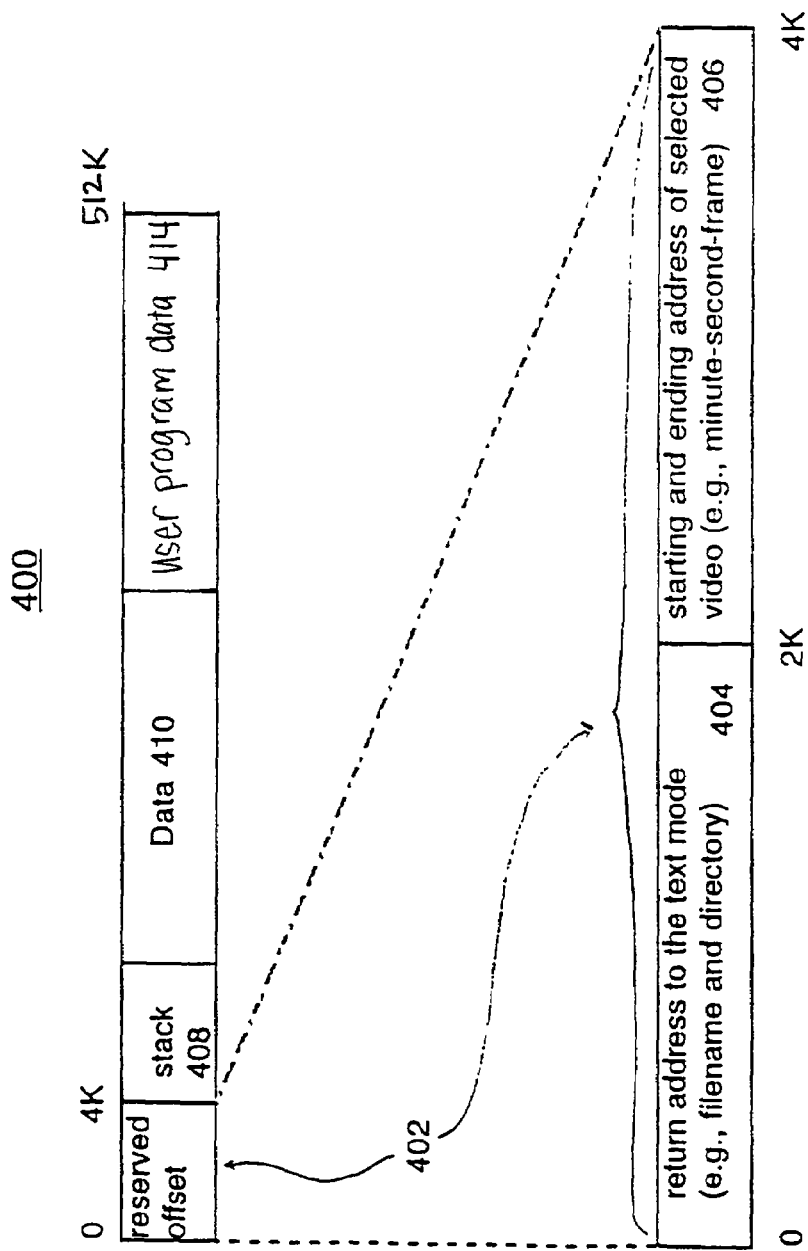
FIG. 4 illustrates a memory map of an exemplary random access memory (RAM) 400 used to access program and data in the present invention.

FIG. 4 illustrates a memory map of an exemplary random access memory (RAM) 400 used to access program and data. In one embodiment, the RAM 400 consists of 512K (kilobytes). Although the present invention uses 512K of memory, it can also utilize other memory sizes. The RAM 400 is used to hold data such as stack pointers 408, data 410, and user program data 414. In addition, the present invention stores the return address to the browser mode (i.e., the original browser page) and the address of a selected video in a reserved offset 402 in the RAM 400 to allow switching between browser and video modes. The reserved offset 402 of 4K is further illustrated in a blowup view.

In the present invention, the small portion or offset 402 of the memory is set aside exclusively for storing the return address to the browser mode 404 and the address of the selected video 406. According to one embodiment, the size of the portion or offset 402 of the memory exclusively reserved for such purpose is 4K. It should be noted that even though the preferred embodiment of the present invention utilizes the first 4K of the memory as the reserved offset, the 4K offset can be chosen from any contiguous memory space. Although the memory size of 512K RAM with a 4K offset is described in the preferred embodiment, various other memory sizes and offsets are equally suitable for use in the present invention.

The reserved offset 402 of memory space is further subdivided into two halves of preferably 2K each. One half is reserved for storing the return address to the original browser mode 404. The other half stores the address of the selected video 406. According to the preferred embodiment of the present invention, the first half contains the return address 404 of the browser page by storing the filename and its associated directory name as stored in the VCD-ROM disk. The second half of the 4K offset is reserved for storing the starting and ending addresses of the selected video 406. In the alternative embodiment, the arrangement is reversed with the first half of the offset containing the address of the selected video and the second half of the offset containing the return address to the browser page.

Figure 5:
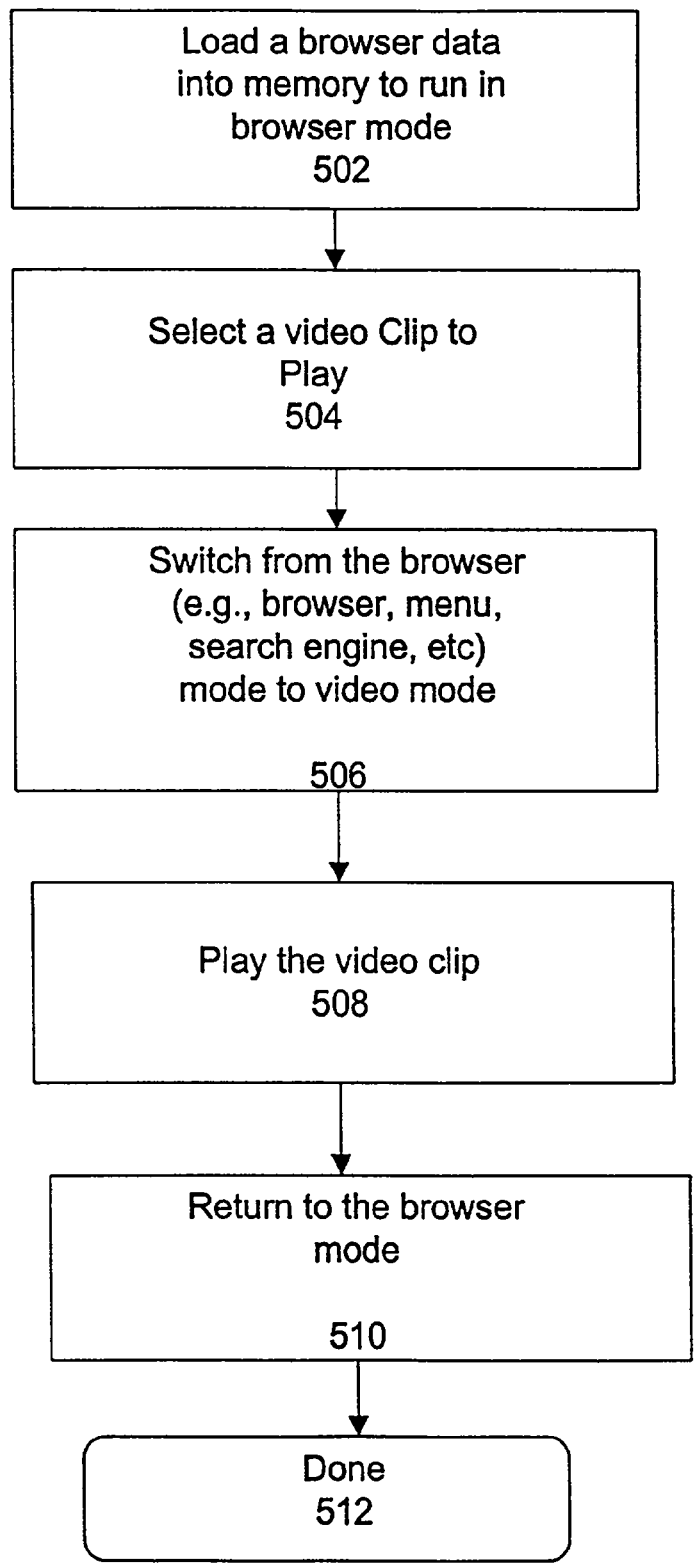
FIG. 5 illustrates a flow chart of the steps involved in switching between browser and video modes.

FIG. 5 illustrates a flow chart of the steps involved in switching between browser and video modes. A browser data segment is first loaded into a memory (e.g., RAM) in step 502. The browser program provides the browser mode and enables a user to navigate and browse the contents of the VCD-ROM disk. In the present invention, browser mode refers to all modes exclusive of video mode, which refers to the playing of video (e.g., movies, video clips, etc.). Then in step 504, a user selects a video to play. The present invention then switches from the browser mode to video mode in step 506. In the video mode, the video is then played in step 508. After the video is played, the present invention returns to the original browser mode automatically at step 510. The process then terminates at step 512.

Figure 6:
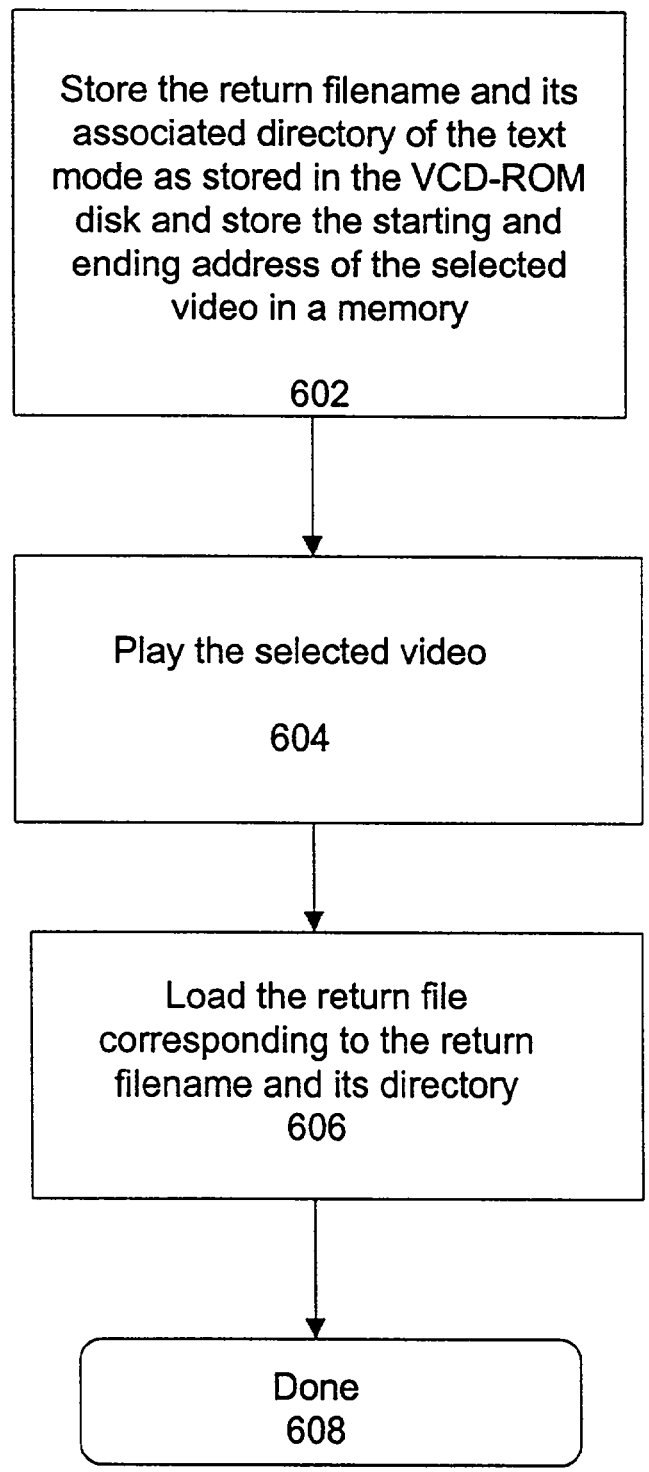
FIG. 6 illustrates more detailed steps involved in switching between browser and video modes in accordance with the present invention.

FIG. 6 illustrates more detailed steps involved in switching between browser and video modes. When the user selects a video to play in the browser (e.g., browser, menu, etc.) mode, the present invention saves two types of information in step 602. First, the return filename corresponding to the displayed browser mode page is saved in a reserved portion of the memory such as RAM. The return filename identifies the file stored in the VCD-ROM disk and thus serves as a return address to the browser mode page. In addition, the precise address of the selected video is saved and stored in the reserved portion of the memory. The address of the selected video is defined by the starting address and the ending address of the video in the VCD-ROM disk. Both the starting and ending addresses are preferably defined by minute-second-frame (m-s-frame), which is a well known CD-ROM recording format.

Then in step 604, the present invention plays the selected video. When the selected video is finished playing, the present invention returns to the original browser mode page by loading the return file corresponding to the return filename and its directory as stored in the VCD-ROM disk in step 606. Since the filename of the original browser mode page and its associated directory were saved in a reserved portion of the memory, the original browser mode (i.e., browser page) is restored. The process then terminates in step 608.

The switching method and system of the present invention saves memory in an inexpensive standalone VCD player. This is because the present invention allows only one mode to have access to the unreserved memory at a time. In particular, the MPEG decoder is allowed to use almost the entire memory space (i.e., RAM) for decoding a video stream during video mode, less memory is required. On the other hand, during the browser mode, the present invention allows full access to the memory by a browser or a menu program. In this manner, substantial savings in cost are realized.

The present invention, a VCD-ROM switching method and system, is thus described. While the present invention has been described in particular embodiments, it should be appreciated that the present invention should not be construed as being limited by such embodiments, but rather construed according to the claims below.

What is claimed is:

1. A method for switching between a browser mode and a video mode in a video system for playing a video having a plurality of video clips, the method comprising the steps of:
   loading, in the browser mode, data segment of a browser program into a memory for use by a user to browse contents of the video representative of the video clips;
   selecting, while in the browser mode, one of the video clips by browsing the contents of the video for playback;
   storing a return address for the browser mode in the memory, in response to the selecting step;
   switching from the browser mode to a the video mode, in response to the selecting step;
   displacing the data segment of the browser program in the memory with a video bitstream representative of the video clip;
   playing the video clip from the memory in the video mode;
   retrieving the return address for the browser mode from the memory after the playing step; and
   returning to the browser mode according to the return address to enable the user to resume the browsing of the contents of the video representative of the video clips, wherein the returning step includes displacing the video bitstream in the memory with the data segment of the browser program.

2. The method as recited in claim 1 further comprises the steps of:
   storing a filename as the return address for the browser mode; and
   storing starting and ending addresses of the video clip in the memory.

3. The method as recited in claim 1 wherein the returning step further comprises loading a return file corresponding to the return address.

4. The method as recited in claim 1 wherein the data segment of the browser program includes HTML text.

5. The method as recited in claim 1 wherein the data segment of the browser program includes images.

6. The method as recited in claim 5 wherein the images are GIF or JPEG images.

7. A video system capable of switching between a browser mode and a video mode and playing a video having a plurality of video clips, the video system comprising:
   means for loading, in the browser mode, data segment of a browser program into a memory for use by a user to browse contents of the video representative of the video clips;
   means for selecting, while in the browser mode, one of the video clips by browsing the contents of the video for playback;
   means for storing a return address for the browser mode in the memory, in response to the selecting means;
   means for switching from the browser mode to the video mode, in response to the selecting means;
   means for displacing the data segment of the browser program in the memory with a video bitstream representative of the video clip;
   means for playing the video clip from the memory in the video mode;
   means for retrieving the return address for the browser mode from the memory after playing the video clip; and
   means for returning to the browser mode according to the return address to enable the user to resume the browsing of the contents of the video representative of the video clips, wherein the returning means displaces the video bitstream in the memory with the data segment of the browser program.

8. The video system as recited in claim 7 further comprising:
   means for storing a filename as the return address for the browser mode; and
   means for storing starting and ending addresses of the video clip in the memory.

9. The video system as recited in claim 7 wherein the returning means further loads a return file corresponding to the return address.

10. The video system as recited in claim 7 wherein the data segment of the browser program includes HTML text.

11. The video system as recited in claim 7 wherein the data segment of the browser program includes images.

12. The video system as recited in claim 11 wherein the images are GIF or JPEG images.

13. A processor readable storage medium having processor readable code embodied on said processor readable storage medium, said processor readable code for programming a processor to perform a method for switching between a browser mode and a video mode in a video system for playing a video having a plurality of video clips, the method comprising the steps of:
   loading, in the browser mode, data segment of a browser program into a memory for use by a user to browse contents of the video representative of the video clips;
   selecting, while in the browser mode, a one of the video clips by browsing the contents of the video for playback;
   storing a return address for the browser mode in the memory, in response to the selecting step;
   switching from the browser mode to the video mode, in response to the selecting step;
   displacing the data segment of the browser program in the memory with a video bitstream representative of the video clip;
   playing the video clip from the memory in the video mode;
   retrieving the return address for the browser mode from the memory after the playing step; and
   returning to the browser mode according to the return address to enable the user to resume the browsing of the contents of the video representative of the video clips, wherein the returning step includes displacing the video bitstream in the memory with the data segment of the browser program.

14. The processor readable storage medium as recited in claim 13, wherein the method further comprises the steps of:
   storing a filename as the return address for the browser mode; and
   storing starting and ending addresses of the video clip in the memory.

15. The processor readable storage medium as recited in claim 13 wherein the returning step further comprises loading a return file corresponding to the return address.

16. The processor readable storage medium as recited in claim 13 wherein the data step of the browser program includes HTML text.

17. The processor readable storage medium as recited in claim 13 wherein the data segment of the browser program includes images.

18. The processor readable storage medium as recited in claim 17 wherein the images are GIF or JPEG images.

* * * * *